United States Patent
Lv

(10) Patent No.: US 8,820,426 B2
(45) Date of Patent: Sep. 2, 2014

(54) ROTARY WEEDING DEVICE

(76) Inventor: Ke Lv, Tianjin (CN)

( * ) Notice: Subject to any disclaimer, the term of this patent is extended or adjusted under 35 U.S.C. 154(b) by 130 days.

(21) Appl. No.: 13/130,043

(22) PCT Filed: Oct. 29, 2010

(86) PCT No.: PCT/CN2010/078242
§ 371 (c)(1),
(2), (4) Date: May 18, 2011

(87) PCT Pub. No.: WO2012/045215
PCT Pub. Date: Apr. 12, 2012

(65) Prior Publication Data
US 2012/0085558 A1 Apr. 12, 2012

(30) Foreign Application Priority Data

Oct. 8, 2010 (CN) .......................... 2010 1 0299484

(51) Int. Cl.
*A01B 33/00* (2006.01)
*A01B 1/16* (2006.01)

(52) U.S. Cl.
CPC ....................................... *A01B 1/16* (2013.01)
USPC ................................ 172/41; 172/25; 172/371

(58) Field of Classification Search
CPC .......... A01B 1/16; A01B 1/165; A01B 35/18; A01B 39/08; A01B 39/085; A01B 39/18; A01B 39/19
USPC ............... 172/17, 21, 41, 42, 43, 44, 371, 25; 175/20; 254/132; 294/50.9; 7/114
See application file for complete search history.

(56) References Cited

U.S. PATENT DOCUMENTS

| | | | | |
|---|---|---|---|---|
| RE21,274 | E | * | 11/1939 | Orr ................................. 56/10.1 |
| 2,250,671 | A | * | 7/1941 | Joy ................................. 175/173 |
| 2,519,779 | A | * | 8/1950 | Moon ............................. 56/10.1 |
| 2,625,867 | A | * | 1/1953 | Hands, Jr. ......................... 172/41 |
| 2,648,187 | A | * | 8/1953 | Ries ................................ 56/16.9 |
| 2,779,259 | A | * | 1/1957 | Kelsey ............................. 172/41 |
| 2,975,848 | A | * | 3/1961 | Roberts .......................... 173/216 |
| 2,991,838 | A | * | 7/1961 | Lane .............................. 175/220 |
| 3,129,771 | A | * | 4/1964 | Lidstone ......................... 172/25 |

(Continued)

FOREIGN PATENT DOCUMENTS

| CN | 2843024 | 12/2006 |
|---|---|---|
| CN | 101095388 | 1/2008 |

*Primary Examiner* — Jamie L McGowan
(74) *Attorney, Agent, or Firm* — Fay Kaplun & Marcin, LLP

(57) ABSTRACT

A rotary weeding device is disclosed and includes: a cylindrical shell; a motor and a transmission connected to the motor, both of which are provided within the shell; a shaft driven by the transmission; and a composite cutter arranged at a distal end of the shaft; the motor may be driven by a DC battery or AC to drive the transmission, and thus rotating the composite cutter through the shaft; a proximal end of the shell is provided with a connecting rod connected to a control handle, with power lines of the DC battery passing through the connecting rod; and the control handle is provided with a speed tuning switch and a charging socket. The weeding device is advantageous over the existing weeding device for the manner of rotary drilling-cut and breaking of both leaves and roots of individual weeds. The nearby grassland may not be damaged during the weeding operation because the composite cutter is small. The weeding device is also advantageous for a higher efficiency and a better effect over the traditional manual weeding.

5 Claims, 2 Drawing Sheets

(56) References Cited

U.S. PATENT DOCUMENTS

| | | | |
|---|---|---|---|
| 3,444,934 A * | 5/1969 | Alberto | 172/25 |
| 3,621,920 A * | 11/1971 | Brown | 172/21 |
| 4,133,389 A * | 1/1979 | Ruhl et al. | 172/41 |
| 4,293,041 A * | 10/1981 | Holmstadt et al. | 172/39 |
| D265,826 S * | 8/1982 | Holmstadt et al. | D15/12 |
| 4,469,184 A * | 9/1984 | Simpson | 172/41 |
| 4,688,376 A * | 8/1987 | Wolfe, Sr. | 56/16.7 |
| 4,893,457 A * | 1/1990 | Castain | 56/295 |
| 4,911,247 A * | 3/1990 | Kuhlmann et al. | 172/41 |
| 5,142,853 A * | 9/1992 | Routery | 56/242 |
| 5,239,755 A * | 8/1993 | Kramer | 30/264 |
| 5,330,014 A * | 7/1994 | Wagner | 175/18 |
| 5,477,665 A * | 12/1995 | Stout | 56/16.7 |
| D398,817 S * | 9/1998 | Meisner et al. | D8/8 |
| 5,865,259 A * | 2/1999 | Catto | 172/25 |
| 5,970,694 A * | 10/1999 | Knox, Jr. | 56/16.7 |
| 6,189,627 B1 * | 2/2001 | Marshall et al. | 172/41 |
| 6,340,061 B2 * | 1/2002 | Marshall et al. | 172/41 |
| 6,595,298 B1 * | 7/2003 | Crady | 172/41 |
| 6,745,549 B1 * | 6/2004 | Taylor | 56/12.7 |
| 6,854,524 B1 * | 2/2005 | Williams | 172/13 |
| 7,036,297 B2 * | 5/2006 | Popp | 56/12.7 |
| D582,734 S * | 12/2008 | Murray et al. | D8/8 |
| 7,748,470 B2 * | 7/2010 | Ortiz | 172/13 |
| 2006/0070752 A1 * | 4/2006 | Amor et al. | 172/41 |
| 2010/0230123 A1 * | 9/2010 | Ortiz | 172/41 |

* cited by examiner

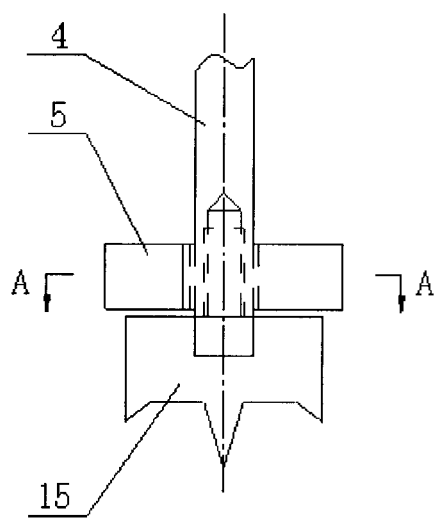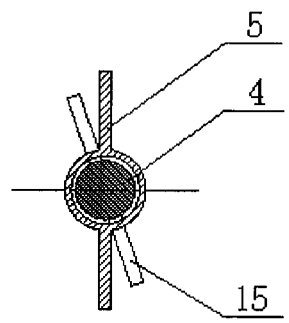
Figure 2                    Figure 3

ROTARY WEEDING DEVICE

CROSS-REFERENCE TO RELATED APPLICATIONS:

This application is a U.S. national stage filing of International Application No. PCT/CN2010/078242, filed Oct. 29, 2010, claiming priority from Chinese Application No. 201010299484.6, filed Oct. 8, 2010, which are both incorporated herein by reference in their entirety.

FIELD OF THE INVENTION

The present application relates to a weeding device, and particularly to a device for weeding rotationally.

BACKGROUND OF THE INVENTION

There exists a known weeding device, e.g. the rolling-cut type weeding wheel as disclosed in the Chinese utility patent No. ZL200520019132.5, which is provided with a rolling-cut structure used for flipping the soil to get rid of weeds in the soil. In the known weeding device, a flat spade for flipping grass roots out of the soil is amounted at a tangent on the weeding wheel. However, such a known weeding device is typically applicable to weeds of a large area, but not to one or more individual weeds.

Chinese patent application No. CN101095388 discloses a rolling-cut disc type inter-row weeder, which includes a cradle, a concave disk, a fixed mount and a suspension arm. The cradle is equipped with two lines of weeding devices interleavedly in tandem, with each weeding device being composed of two concave disks arranged staggeredly in tandem, each of which forms an angle between 25° and 30° with the advancing direction of the weeder. The weeder requires no driving power in operation, and the concave disks are rotated by the friction force generated between the disks and the soil, in order for weeding. However, the disclosed weeder is applicable to weeds between ridges in a field, instead of weeds in a grassland.

Generally, weeds in a grassland are gotten rid of by hand, which is disadvantageous for a low efficiency on one hand, and an uncertain quality on the other hand, for example, the weeds cannot be uprooted.

Particularly, soil of some grassland may harden, which makes it very difficult for manual weeding even with some simple mechanism.

SUMMARY OF THE INVENTION

The invention provides a weeding device for weeding weeds in a grassland.

An object of the invention is achieved with solutions provided as follows.

The invention discloses a rotary weeding device, including: a cylindrical shell; a motor and a transmission connected to the motor, both of which are provided within the shell; a shaft driven by the transmission; and a composite cutter arranged at a distal end of the shaft; the motor may be driven by a Direct Current (DC) battery or Alternative Current (AC) to drive the transmission, and thus rotating the composite cutter through the shaft; a proximal end of the shell is provided with a connecting rod which is connected to a control handle, with power lines of the DC battery passing through the connecting rod; and the control handle is provided with a speed tuning switch and a charging socket.

The distal end of the shell is provided with a triangular bracket which is connected with the shell through pin joints, a restoring spring is provided at a cardinal axis of the pin joint, and distal ends of the triangular bracket are provided with rolling wheels.

The charging socket provided on the control handle may be used for charging with a charger. The connecting rod connected to the control handle may be preferably telescopic, thereby reducing the overall volume of the rotary weeding device.

The composite cutter may include a fixed cutter and a rotary cutter. The rotary cutter is connected to the shaft and provided at the front end of the fixed cutter, and is rotated by the driving of the shaft. The fixed cutter is passed through by the shaft. The adjacent faces of the fixed cutter and the rotary cutter are in shearing cooperation with each other, and the shearing is performed by the relative rotation of the fixed cutter and the rotary cutter, so that weeds may not be winded around the shaft, and reduction of the weeding efficiency is avoided.

The rotary cutter is centrally provided with a tapering tip, and cutting portions are extended downwards along the edges of the rotary cutter in the longitudinal direction of the rotary cutter. In this way, when the rotary cutter is rotated, its central tapering tip flips soil around, while its cutting portions ensure the diameter of a hole made by the rotation of the rotary cutter, as a result, the weed roots can be broken.

To use the rotary weeding device of the invention, a user holds the control handle to keep the shell upstanding, places the composite cutter at the position of the root of a weed, turns on the speed tuning switch and presses downwards the control handle, thus, the composite cutter is rotated and flips soil at the position of the weed, so that both the leaves and root of the weed can be broken, and the weed can be uprooted. When the control handle is pressed downwards, the triangular bracket is expanded outwards simultaneously, but will not damage the nearby grassland due to the presence of the rolling wheels. Upon completion of a weeding cycle, the user may pull the composite cutter out of the soil through the control handle, and the triangular bracket shrinks with the effect of gravity and restoring force of the restoring spring. If the restoring force of the spring is large enough, the composite cutter may be pulled out of the soil with the restoring force of the spring.

The weeding device of the invention is advantageous over the existing weeding device for the manner of rotary drilling-cut and breaking of both leaves and roots of individual weeds. In addition, the nearby grassland may not be damaged during the weeding operation because the composite cutter is small.

The weeding device of the invention is advantageous for a higher efficiency and a better effect over the traditional manual weeding.

Especially, the weeding device of the invention is more efficient in weeding on hardened grassland than ordinary weeding device. The grassland may easily harden due to the sunlight after a rain, and the weeding device of the invention is also applicable to such hardened grassland.

BRIEF DESCRIPTION OF THE DRAWINGS

Embodiments of the invention are described in detail with reference to the accompany drawings.

FIG. 2 shows the structure of a composite cutter of the rotary weeding device; and FIG. 3 is a rear view taken along A-A section of FIG. 2.

Figure 1:
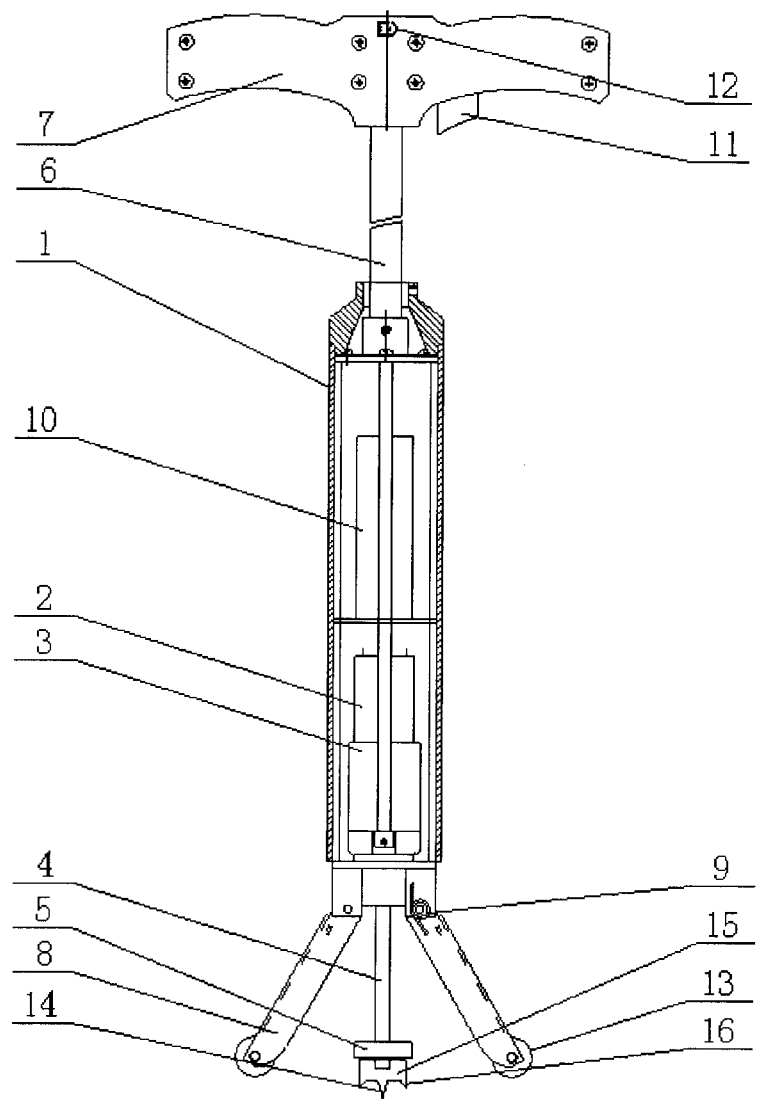
FIG. 1 shows an overall structure of the rotary weeding device according to an embodiment of the invention.

| Reference list: | | |
|---|---|---|
| 1: Shell; | 2: Motor; | 3: Transmission; |
| 4: Shaft; | 5: Fixed cutter; | 6: Connecting rod; |
| 7: Control handle; | 8: Triangular bracket; | 9: Restoring spring; |
| 10: DC battery; | 11: Speed tuning switch; | 12: Charging socket; |
| 13: Rolling wheel; | 14: Tapering tip; | 15: Rotary cutter; |
| 16: Cutting portion | | |

DETAILED DESCRIPTION OF THE EMBODIMENTS

FIGS. 1-3 shows a rotary weeding device according to an embodiment of the invention, which includes: a cylindrical shell 1; a motor 2 and a transmission 3 connected to the motor 2, both of which are provided within the shell 1; a shaft 4 driven by the transmission 3; and a composite cutter arranged at a distal end of the shaft 4. The composite cutter may include a fixed cutter 5 and a rotary cutter 15. The rotary cutter 15 is connected to the shaft 4 and provided at the front end of the fixed cutter 5, and is rotated by the driving of the shaft 4. The fixed cutter 5 is passed through by the shaft 4. The adjacent faces of the fixed cutter 5 and the rotary cutter 15 are in shearing cooperation with each other, and the shearing is performed by the relative rotation of the fixed cutter 5 and the rotary cutter 15, so that weeds may not be winded around the shaft 4, and reduction of the weeding efficiency is avoided.

The motor 2 may be driven by a DC battery 10 or AC to drive the transmission 3, and thus rotating the rotary cutter 15 of the composite cutter through the shaft 4.

A proximal end of the shell 1 is provided with a connecting rod 6 which is connected to a control handle 7, with power lines of the DC battery passing through the connecting rod 6; and the control handle 7 is provided with a speed tuning switch 11 and a charging socket 12.

The distal end of the shell 1 is provided with a triangular bracket 8 which is connected with the shell 1 through pin joints, a restoring spring 9 is provided at a cardinal axis of the pin joint, and distal ends of the triangular bracket 8 are provided with rolling wheels 13.

The charging socket 12 provided on the control handle 7 may be used for charging with a charger. The connecting rod 6 connected to the control handle 7 may be preferably telescopic, thereby reducing the overall volume of the rotary weeding device.

The rotary cutter 15 is centrally provided with a tapering tip 14, and cutting portions 16 are extended downwards along the edges of the rotary cutter 15 in the longitudinal direction of the rotary cutter 15. In this way, when the rotary cutter 15 is rotated, its central tapering tip 14 flips soil around, while its cutting portions 16 ensure the diameter of a hole made by the rotation of the rotary cutter 15.

To use the rotary weeding device of the invention, a user holds the control handle 7 to keep the shell 1 upstanding, places the composite cutter at the position of the root of a weed, turns on the speed tuning switch 11 and presses downwards the control handle 7, thus, the rotary cutter 15 of the composite cutter is rotated and flips soil at the position of the weed, so that both the leaves and root of the weed can be broken, and the weed can be uprooted. The fixed cutter 5 may be locked on the wall of the hole made by the rotation of the rotary cutter 15, and adjacent faces of the fixed cutter 15 and the rotary cutter 15 are in shearing cooperation with each other to shear weeds, so that the weeds may not be winded around the shaft during the operation of the weeding device, and reduction of the weeding efficiency is avoided. When the control handle 7 is pressed downwards, the triangular bracket 8 is expanded outwards simultaneously, but will not damage the nearby grassland due to the presence of the rolling wheels 13. Upon completion of a weeding cycle, the user may pull the composite cutter out of the soil through the control handle 7, and the triangular bracket 8 shrinks with the effect of gravity and restoring force of the restoring spring. If the restoring force of the spring 9 is large enough, the composite cutter may be pulled out of the soil with the restoring force of the spring 9.

The weeding device of the invention is advantageous over the existing weeding device for the manner of rotary drilling-cut and breaking of both leaves and roots of individual weeds. In addition, the nearby grassland may not be damaged during the weeding operation because the composite cutter is small.

The weeding device of the invention is advantageous for a higher efficiency and a better effect over the traditional manual weeding.

Especially, the weeding device of the invention is more efficient in weeding on hardened grassland than ordinary weeding device. The grassland may easily harden due to the sunlight after a rain, and the weeding device of the invention is also applicable to such hardened grassland.

The invention claimed is:

1. A rotary weeding device, comprising:
   a cylindrical shell;
   a motor and a transmission connected to the motor, both of which are provided within the shell;
   a shaft driven by the transmission; and
   a composite cutter arranged at a distal end of the shaft,
   wherein the composite cutter includes a fixed cutter and a rotary cutter, the rotary cutter being connected to the shaft, provided at the front end of the fixed cutter, and rotated by the driving of the shaft about a longitudinal axis thereof; the fixed cutter being passed through by the shaft, adjacent faces of the fixed cutter and the rotary cutter being in shearing cooperation with each other, and the shearing being performed by relative rotation of the fixed cutter and the rotary cutter,
   wherein the rotary cutter includes a centrally provided tapering tip extending therefrom and tapering along the longitudinal axis, and cutting portions are extended downwards along the edges of the rotary cutter in the longitudinal direction of the rotary cutter.

2. The rotary weeding device of claim 1, wherein a connecting rod which is connected to a control handle is provided at a proximal end of the shell, with power lines of a Direct Current battery passing through the connecting rod, and the control handle is provided with a speed tuning switch and a charging socket.

3. The rotary weeding device of claim 1, wherein a triangular bracket connected with the shell through pin joints is provided at the distal end of the shell, and rolling wheels are provided at distal ends of the triangular bracket.

4. The rotary weeding device of claim 3, wherein a restoring spring is provided at a cardinal axis of the pin joint.

5. The rotary weeding device of claim 2, wherein the connecting rod connected to the control handle is telescopic.

* * * * *